April 1, 1930. E. S. MEAD 1,752,684
CENTRAL HEATING SYSTEM
Filed July 12, 1927   2 Sheets-Sheet 1

INVENTOR
Edward S. Mead
BY
ATTORNEY

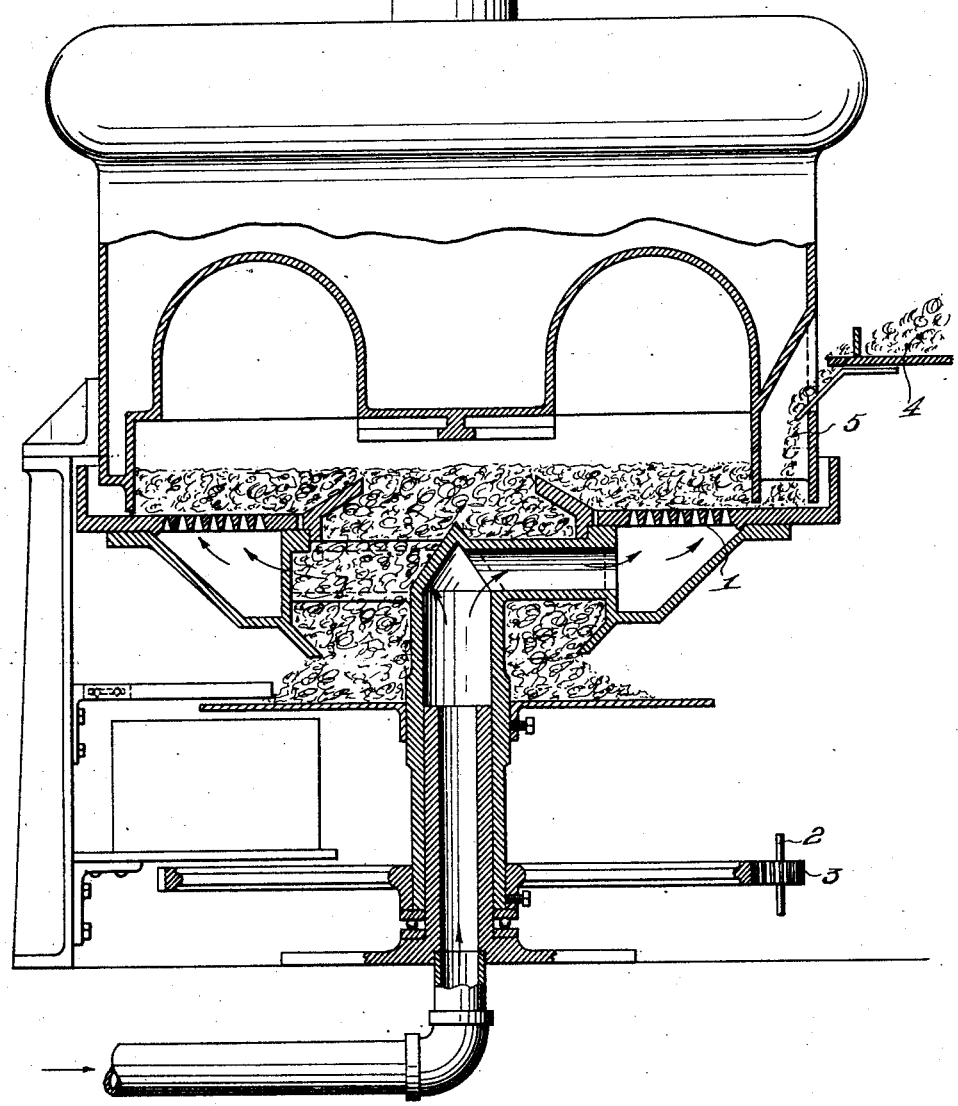

Patented Apr. 1, 1930

1,752,684

UNITED STATES PATENT OFFICE

EDWARD SHERWOOD MEAD, OF PHILADELPHIA, PENNSYLVANIA

CENTRAL HEATING SYSTEM

Application filed July 12, 1927. Serial No. 205,161.

My invention relates to central heating systems and more particularly, to systems in which automatically operated stoker furnaces are employed.

The present central heating plants in use for supplying steam to heat buildings located in the business districts, involve the construction of comparatively large sized power houses and require laborers for operating the furnaces. By reason of the fact that such large power plants can burn cheaper coal and obtain far greater efficiency in burning the coal than can be obtained with the wasteful domestic heating plants using anthracite, these central heating plants have been able to deliver heat at a price equal to that at which domestic furnaces are operated. The central heating plants, however, are primarily designed to deliver comparatively large quantities of heat and are accordingly commercially successful only in large business centers where the demand is large.

The interest on the large investment which runs on during the summer months while the furnace is idle, the seasonal character of the work which means a higher labor cost than usual, and the continual maintenance required, make the operation of such a plant for selling comparatively small quantities of heat such as are needed by the average sized dwelling in residental districts out of question. For this reason, the development of central heating plants has been limited to districts where the houses are comparatively large, and which consume from fifteen to thirty tons of coal a year. The average American home, therefore, has not been supplied with heat from a central heating plant.

The demand and need for such a service are however unquestionably present. The average domestic furnace operator is unacquainted with the principle of furnace operation and even if he were skilled in its operation, the time which he can devote to the furnace is so short that efficient combustion is not obtained. Not only is the combustion poor and inefficient, but the difficulties of bringing up a fire or properly banking it, is so great in the case of a single furnace that when a sudden cold spell is encountered, difficulties are experienced in quickly providing the necessary heat, whereas during a sudden warm period the furnace delivers unnecessary heat.

In addition to this undesirable and costly operation of the furnace, there is the inconvenience and annoyance attendant upon operation of the furnace, such as the dirt, the removal of the ashes, etc.

The recent development of automatic stoker furnaces which burn anthracite coal represents the first step in an effort to release the domestic operator from his onerous duties. These furnaces were intended for individual use to replace the present house furnaces. While such an arrangement would be desirable, it was found that in actual practice these automatic stokers are still too expensive and cumbersome for use individually. The development of the automatic stoker, therefore, was not in itself sufficient to solve the needs of domestic use, and in the average moderate sized dwelling, the inefficient old-type furnace continues in use because of the cost of an automatic stoker.

Accordingly an object of my invention is to provide means for supplying heat for groups of moderate sized dwellings at a comparatively low cost.

Another object of my invention is to provide a simple and efficient central heating plant for blocks of medium sized dwellings.

Another object of my invention is to provide means for operating automatic stoker furnaces to heat a block of dwellings.

A still further object of my invention is to provide automatic control means for variably operating automatic stoker furnaces in accordance with varying conditions in a block of dwellings which are to be heated thereby.

There are other objects of my invention, which, together with the foregoing will appear in the specification which follows. In the accompanying drawings:

Fig. 2 is an elevational view partly in section of the automatic stoker furnace.

Fig. 3 is a modification of the control shown in Fig. 1.

Figure 1:
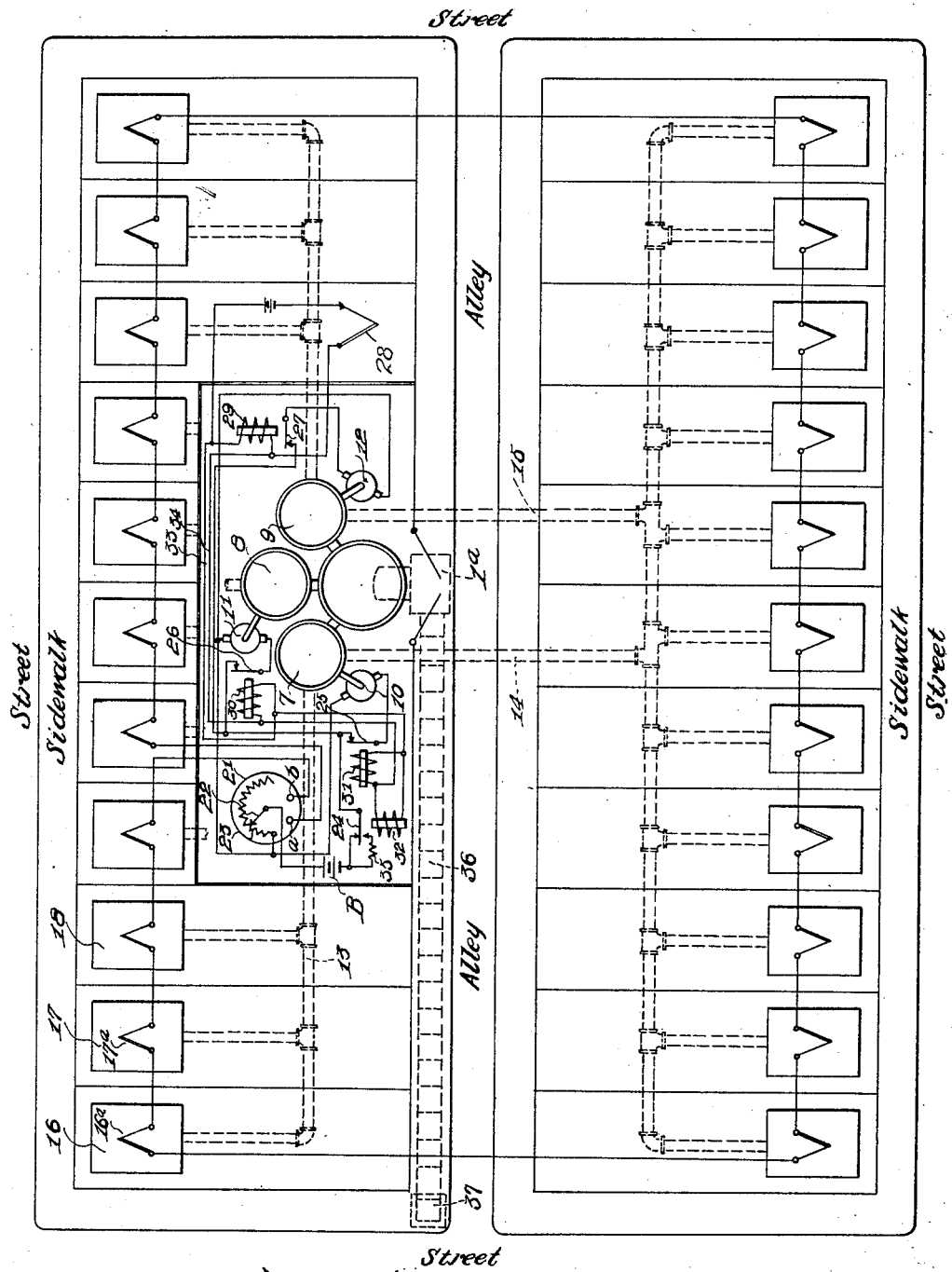
Fig. 1 is a diagrammatic illustration of a block of houses and a preferred form of the central heating plant which I employ in my invention.

Referring to Fig. 1, the automatic stoker type of furnace of one of the preferred forms which I employ in my invention is disclosed, the detailed description of which is given in the patent to Wedge, Patent Number 1,582,952 issued May 4, 1926. A feature of this furnace is the simple method for automatically feeding the coal radially along a disk type grate, 1. Coal is fed from a bin 1ª, located beneath a manhole so as to be easily supplied with coal, into a hopper 4. As fast as the coal from the hopper is supplied to the grate 1, a fresh supply is fed to the hopper 4 from the bin. By filling the bin at periodic intervals, the coal supply to the furnace is thus made automatic.

The grate 1 is rotated by means of a suitable shaft 2, driven by a motor (not shown) through the gear 3. As the grate rotates, fuel is supplied from the hopper 4, dropping down at 5. The fuel is then fed towards the center of the grate as the grate rotates. The details of operation of the furnace have been described in the above mentioned patent and therefore will not be repeated here as it is not part of this invention.

Referring to Fig. 1, the central heating system comprises a battery of furnaces 7, 8, and 9 of the type disclosed in Fig. 2, having stoker mechanism rotated by motors 10, 11, and 12, respectively. Steam lines 13, 14, and 15, suitably connected to the boilers (not shown) of furnaces 7, 8, and 9, conduct the steam therefrom to the houses 16, 17, 18, etc., shown diagrammatically as rectangles. Although in the preferred embodiment of my invention I employ steam heat, it is evident that any other heating system such as hot water or hot air may be employed.

A thermocouple 16ª, 17ª, etc., of any preferred type is located in each house and is responsive to changing temperature conditions therein, and is electrically connected in series with the devices in the other houses and across the coils of a meter 21 at terminals $a$ and $b$.

The meter 21 is of any suitable type such as a properly calibrated voltmeter and in the circuit disclosed, will measure the totalized electro-motive force of all of the thermocouples. With a predetermined number of houses in the system, the total voltage generated for an average temperature can be estimated. The total voltage is always divisible by the number of houses and the meter will therefore indicate the average temperature in all of the houses.

The indicator 22 operated by the meter 21 moves over a potentiometer 23 and varies the current flow in the armature windings of motors 10, 11 and 12, the circuits for which are completed over the potentiometer 23, indicator 22, the battery B, back contact and armature 24, back contact and armature 25, through the armature windings of motor 10, back to the potentiometer 23. A circuit shunting the motor 10 through the potentiometer 23 is completed over the back contact and armature 26 for the motor 11 and the back contact and armature 27 for the motor 12.

It is evident from the above, that the flow of current through the motors 10, 11, and 12, is directly controlled by the position of the indicator 22 on the potentiometer 23. Since the latter is controlled by the average temperature of all of the houses, the speed of operation of the motors 10 and 12, or in other words, the rate at which coal is being consumed is directly controlled by the average temperature in all of the houses. Although in the preferred form of my invention, I connect the thermocouple in series in order to obtain the average temperature values, it is obvious that a shunt arrangement may be employed in which the currents instead of the voltages are added for controlling an ammeter instead of a voltmeter. The thermocouples may be arranged to individually control the motors in such a manner that when any one temperature falls below a predetermined value, the speed of the motors is increased.

It is also evident that the potentiometer control is merely a schematic illustration of the control and that in actual practice any of the well known control means such as that shown in the Patent Number 1,356,804 issued October 26, 1920, operated by a galvanometer would be employed in place of the direct potentiometer shown.

An additional thermostatic device 28, not shown as a thermocouple, responsive to outside temperature, is arranged in obvious circuits to control the relays 29, 30, 31 and 32. The relays 29 to 31 are marginal relays of the well known type which operate only in response to excessive currents. This may be accomplished in any one of a number of ways, one of which is to tension the spring member of the relay armature so as to prevent its operation until the magnetic pull reaches a predetermined value.

The thermocouple 28 is positioned to be operated by the outside temperature in any desired manner. The current flow in the thermocouple circuit during cold weather is too small to operate any of the relays. If, however, the weather becomes somewhat milder, the flow of current in the circuit is sufficient to operate the relay 32 over the conductors 33 and 34. Operation of the relay 32 switches the motor circuits from the back contact of armature 24 to the front contact, thereby adding the resistance 35 to the motor circuits which in turn reduces the flow of current and speed of motor rotation.

In this manner, the speed of the motors is controlled by the outside temperature, and the motors will operate slower as the outside temperature rises. Although I have shown but one relay 32 controlled by the thermocouple device 28, for adjustably controlling the electrical circuit of the motors, it is obvious that a number of such relays adjusted to operate at different current values and controlling the insertion of resistances such as 35 to the motor circuit may be connected in the circuit for adjustably controlling the electrical circuits of the motors in accordance with the changes of outside temperature.

When the temperature reaches a predetermined value so that it is desirable to entirely stop the operation of the motors, the thermocouple 28 will cause the flow of currents in the conductors 33 and 34 to be of sufficient value to operate the relays 29 and 31, thereby opening the operating circuits of motors 10 and 12. Although I have shown an electrical system for automatically controlling the stoker furnaces both by temperature of the houses and by the outside temperature, it is evident that other modifications thereof may be employed within the scope of the invention. Thus the system may be arranged to shut down the furnaces, one at a time as the weather changes by merely making all of the relays 29 to 31 marginal, that is, each responsive to a different value of current.

A more simple arrangement for the automatic control of the furnaces can be obtained by providing a house temperature control operation of the valves controlling the steam supply to the individual houses as shown in Fig. 3. The stoker, in turn, can then be controlled by the conditions of the pressure and temperature of the steam in the boiler. As the demand increases due to the opening of the valves, the pressure of the steam in the boiler will fall and, as a result, will increase the speed of the stoker operation. In this manner a substantially direct automatic control is obtained.

The battery of automatic stoker furnaces is arranged centrally with regard to the houses, preferably in a plot of ground located near the alley way and near the center of the block, although the cellar of one of the houses in the block may be used. An automatic ash conveyor line 36 may be employed for conveying the ashes from the furnace to the loading platform 37, located near the street.

By employing the automatic stoker of the type disclosed in the Wedge patent, a practical and expedient method is provided for supplying heat to a block of houses. The automatic stokers are comparatively simple in design and easy to operate. The initial cost is therefore moderate. Since the stokers are automatic in operation, there is comparatively no labor cost, a feature which is especially desirable in a seasonal operation of this character, and since the stoker is designed to burn a comparatively cheap coal, the operating cost can be limited to values commercially practical for moderate sized houses. By operating batteries of furnaces automatically, for a large number of houses, a better balanced heating can be obtained to smooth out the peaks of extremely cold or mild weather. A single furnace in a house usually cannot supply the necessary heat on an extremely cold day. A battery of furnaces for a block of houses, however, will have the necessary capacity. A considerable saving in cellars, chimneys, and boilers for each individual house is also effected by this arrangement, since these will no longer be needed.

Although in the preferred form of my invention, I have disclosed the Wedge type stoker furnace, it is evident that I may employ any type of automatic furnace which can be built in sizes desirable for a central heating plant for moderate sized house use and therefore I do not intend to limit myself by the specific application of my invention, but only in so far as set forth in the following claims.

I claim:

1. In combination, a central heating plant, a plurality of buildings, means for conducting heating fluids from said central heating plant to said buildings, temperature responsive means in each of said buildings, means controlled by all of said temperature responsive means in accordance with the average temperature in all said buildings and means controlled by said last mentioned means for automatically controlling the operation of said central heating plant.

2. In combination, a central heating plant, a plurality of buildings, means for conducting heating fluids from said central heating plant to said buildings, temperature responsive means in each of said buildings, means for connecting said temperature responsive means in series and means controlled by said series connected temperature responsive means for automatically controlling the operation of said central heating plant.

3. In combination, a central heating plant, a plurality of buildings, means for conducting heating fluids from said central plant to said buildings, a temperature responsive means in each of said buildings all of said temperature responsive means being connected in series, a temperature responsive means subject to outside atmospheric temperature conditions and means controlled jointly by both the temperature responsive means in the buildings and the temperature responsive means outside of the buildings for automatically controlling the operation of said central heating plant.

4. In combination with a central heating plant comprising a bank of furnaces, a common heat distributor means connected to each of said furnaces, and automatic means for controlling combustion in the separate furnaces; of a plurality of buildings arranged in approximate symmetry with respect to said central heating plant and means for controlling the operation of said automatic means in accordance with the average temperature in said buildings.

5. In combination with a central heating plant comprising a bank of furnaces, a common heat distributor means connected to each of said furnaces, and automatic means for controlling combustion in the separate furnaces; of a plurality of buildings arranged in approximate symmetry with respect to said central heating plant and means for controlling the operation of said automatic means in accordance with the average temperature in said buildings and the temperature outside of said buildings.

Signed at Philadelphia, in the county of Philadelphia, and State of Pennsylvania, this eighth day of June, A. D. 1927.

EDWARD SHERWOOD MEAD.